(12) United States Patent
Farroni et al.

(10) Patent No.: US 6,904,214 B2
(45) Date of Patent: Jun. 7, 2005

(54) METHOD OF PROVIDING AN OPTICAL FIBER HAVING A MINIMUM TEMPERATURE SENSITIVITY AT A SELECTED TEMPERATURE

(75) Inventors: Julia Farroni, Windsor, CT (US); Kanishka Tankala, South Windsor, CT (US); Adrian Carter, Bulli (AU); Nils Jacobson, North Granby, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 10/436,623

(22) Filed: May 13, 2003

(65) Prior Publication Data

US 2004/0028361 A1 Feb. 12, 2004

Related U.S. Application Data

(60) Provisional application No. 60/380,700, filed on May 14, 2002.

(51) Int. Cl.$^7$ .......................... C03B 37/02; C03B 37/07; G02B 6/02
(52) U.S. Cl. ............................. 385/123; 65/384; 65/475
(58) Field of Search ................................. 385/123–128, 385/141–143; 65/384, 385, 435, 475

(56) References Cited

U.S. PATENT DOCUMENTS

| | | |
|---|---|---|
| 3,699,472 A | 10/1972 | Young |
| 4,025,156 A | 5/1977 | Gloge et al. |
| 4,106,850 A | 8/1978 | Marcatili |
| 4,111,525 A | 9/1978 | Kaminow et al. |
| 4,165,223 A | 8/1979 | Powers |
| 4,277,270 A | 7/1981 | Krohn |
| 4,358,181 A | 11/1982 | Gulati et al. |
| 4,432,606 A | 2/1984 | Blair |
| 4,482,205 A | 11/1984 | Lagakos et al. |
| 4,636,031 A | 1/1987 | Schmadel, Jr. et al. |
| 4,637,686 A | 1/1987 | Iwamoto et al. |
| 4,768,859 A | 9/1988 | Kasori et al. |
| 4,923,278 A | 5/1990 | Kashyap et al. |
| 4,975,102 A | 12/1990 | Edahiro et al. |
| 4,979,971 A | 12/1990 | Kyoto et al. |
| 5,011,251 A | 4/1991 | Miller et al. |
| 5,018,827 A | 5/1991 | Brownrigg et al. |

(Continued)

FOREIGN PATENT DOCUMENTS

| | | |
|---|---|---|
| EP | 0141038 A2 | 5/1985 |
| EP | 0300471 A1 | 1/1989 |
| EP | 0569182 A1 | 11/1993 |
| EP | 0607990 A1 | 7/1994 |
| EP | 0800098 A2 | 10/1997 |
| EP | 1061386 A1 | 12/2000 |
| GB | 2246234 A | 1/1992 |
| WO | WO 93/18420 | 9/1993 |
| WO | WO 94/00784 | 1/1994 |

OTHER PUBLICATIONS

J.B. Judkins et al., "Temperature–insensitive long–period fiber gratings", OFC '96, Mar. 1996, Postdeadline papers.
K. Shima et al., "A novel temperature–insensitive long–period fiber grating using a boron–codoped–germanosilicate–core fiber", OFC '97, Mar. 1997 Technical Digest, p. 347–348.

(Continued)

*Primary Examiner*—Juliana K. Kang
(74) *Attorney, Agent, or Firm*—Peter J. Rainville

(57) ABSTRACT

An optical fiber for use in making components of an optical communication system has cladding and core materials the constituents of which cause a component made from the fiber to have a rate of change with respect to temperature of a response to a signal which passes through zero at a temperature $T_m$, where the temperature $T_m$ is at or near a selected temperature, or falls within a selected temperature range; and the value of $T_m$ of a fiber can be controllably changed by changing the concentration of a selected constituent of the fiber, such as, for example, the concentration of boron.

10 Claims, 6 Drawing Sheets

U.S. PATENT DOCUMENTS

| | | | |
|---|---|---|---|
| 5,059,475 A | 10/1991 | Sun et al. | |
| 5,064,266 A | 11/1991 | Sun et al. | |
| 5,127,928 A | 7/1992 | Farries et al. | |
| 5,295,205 A | 3/1994 | Miller et al. | |
| 5,295,209 A | 3/1994 | Huber | |
| 5,367,589 A | 11/1994 | MacDonald et al. | |
| 5,430,817 A | 7/1995 | Vengsarkar | |
| 5,488,475 A | 1/1996 | Friebele et al. | |
| 5,517,589 A | 5/1996 | Takeuchi | |
| 5,563,967 A | 10/1996 | Haake | |
| 5,641,956 A | 6/1997 | Vengsarkar et al. | |
| 5,677,920 A | 10/1997 | Waarts et al. | |
| 5,694,503 A | 12/1997 | Fleming et al. | |
| 5,703,978 A | 12/1997 | DiGiovanni et al. | |
| 5,708,740 A | 1/1998 | Cullen | |
| 5,757,540 A | 5/1998 | Judkins et al. | |
| 5,949,934 A | 9/1999 | Shima et al. | |
| 6,011,886 A | 1/2000 | Abramov et al. | |
| 6,044,189 A | 3/2000 | Miller | |
| 6,049,414 A * | 4/2000 | Espindola et al. | 359/337 |
| 6,058,231 A | 5/2000 | Haggans et al. | |
| 6,097,862 A | 8/2000 | Abramov et al. | |
| 6,101,301 A | 8/2000 | Engelberth et al. | |
| 6,108,470 A | 8/2000 | Jin et al. | |
| 6,112,553 A | 9/2000 | Poignant et al. | |
| 6,144,789 A | 11/2000 | Engelberth et al. | |
| 6,147,341 A | 11/2000 | Lemaire et al. | |
| 6,148,128 A | 11/2000 | Jin et al. | |
| 6,151,156 A | 11/2000 | Adlerfligel et al. | |
| 6,181,851 B1 | 1/2001 | Pan et al. | |
| 6,201,918 B1 | 3/2001 | Berkey et al. | |
| 6,314,222 B1 | 11/2001 | Jang et al. | |
| 6,400,884 B1 | 6/2002 | Matano et al. | |
| 6,463,684 B2 | 10/2002 | Jang | |
| 6,487,340 B2 | 11/2002 | Enomoto et al. | |

OTHER PUBLICATIONS

D.L. Williams et al., "Enhanced Photosensitivity in Germania Doped Silica Fibres for Future Optical Networks", Proceed. of 18th European Conference on Optical Communications, vol. 1, Sep. 27, 1992, Berlin, Germany.

A.M. Vengsarkar et al., "Long–Period Fiber Gratings as Band–Rejection Filters", Journal of Lightwave Technology, vol. 14, No. 1, Jan. 1996, p. 58–65.

G. Meltz et al., "Bragg grating formation and germanosilicate fiber photosensitivity", SPIE vol. 1516 International Workshop on Photoinduced Self–Organization Effects in Optical Fiber (1991), p. 185–199.

W. Vogel, "Optical Properties of Oxide Glasses", Optical Properties of Glass, Ed. by D.R. Uhlman & N.J. Kreidl, 1991.

D.L. Williams et al., "Accelerated lifetime tests on UV written intra–core gratings in boron germania codoped silica fiber", Electronics Letters, Nov. 23rd, 1995, vol. 31, No. 24, p. 2120–21.

T. Baak, "Thermal Coefficient of Refractive Index of Optical Glasses", Journal of the Optical Society of America, vol. 59, No. 27, p. 851–857.

D.L. Williams et al., "Enhanced UV Photosensitivity in Boron Codoped Germanosilicate Fibres", Electronics Letters, Jan. 7th, 1993, vol. 29, No. 1, p. 45–47.

A.K. Chu et al., "Multilayer dielectric materials of SiOx/Ta2O5/SiO2 for temperature–stable diode lasers", Materials Chemistry and Physics 42 (1995) 214–216.

G.W. Yoffe et al., "Temperature–compensated optical–fiber Bragg gratings", OFC '95 Technical Digest, Mar. 1995, p. 134–135.

D.L. Williams et al., "Temperature Stable 1.3um Laser with Bragg Fibre Grating External Cavity for Access Networks", Proceedings of the European Conference on Optical Communications, Sep. 12–16, 1993 Regular Papers, vol. 2, No. conf 19, p. 209–212.

D.L. Williams et al., "Broad Bandwidth Highly Reflecting Gratings Formed in Photosensitive Boron Codoped Fibres", Sep. 27, 1992, p. 923–926.

R. Kashyap, "Photosensitive Optical Fibers: Devices and Applications", Optical Fiber Technology, vol. 1, No. 1, 1994, p. 17–34.

M. Wilkinson et al., "D–Fibre Filter for Erbium Gain Spectrum Flattening", Electronics Letters, vol. 28, No. 2, Jan. 16, 1992, p. 131–132.

K. Simmons et al., "Photosensitivity of solgel–derived germanosilicate planar waveguides", Optics Letters, Jan. 1, 1993, vol. 18, No. 1, p. 25–27.

R. Kashyap et al., "Laser–Trimmed Four–Port Bandpass Filter Fabricated in Single–Mode Photosensitive Ge–Doped Planar Waveguide", IEEE Photonics Technology Letters, vol. 5, No. 2, p. 191–194.

G.W. Yoffe et al., "Passive temperature–compensating package for optical fiber gratings", Applied Optics, Oct. 20, 1995, vol. 34, No. 30, p. 6859–6861.

Y.–J. Kim et al., "Measurement of refractive–index variation with temperature", Optics Letters, Aug. 1, 2002, vol. 27, No. 15, p. 1297–1299.

K. Shima et al., "Temperature Insensitive Long–Period Fiber Grating", Fujikura Technical Review, 1998, p. 1–2.

A. Carter; Utility Patent Application No. 10/200,664 filed Jul. 22, 2002, "Optical Fiber Having High Temperature Insensitivity Over A Temperature Range Centered On A Selected Temperature And Method Of Making Same", (copy of application as filed including claims).

* cited by examiner

FIG. 9

[Graph showing minimum temperature vs attenuation (dB/km), with reference line 44]

METHOD OF PROVIDING AN OPTICAL FIBER HAVING A MINIMUM TEMPERATURE SENSITIVITY AT A SELECTED TEMPERATURE

CROSS-REFERENCE TO RELATED APPLICATION

This application claims priority to provisional patent application 60/380,700, filed May 14, 2002 and entitled "Method Of Providing An Optical Fiber Having A Minimum Temperature Sensitivity At A Selected Temperature," and which is herein incorporated by reference.

FIELD OF THE INVENTION

The invention relates to an optical fiber for use in making various fiber devices, such as long-period gratings, of optical communication systems, and deals more particularly with an improved fiber and fiber devices having improved performance in response to changes in temperature. The invention also relates to methods for making such optical fiber and fiber devices.

BACKGROUND OF THE INVENTION

In the making and use of fiber optic system components from specialty fibers it is known that the components customarily have response characteristics dependent on the temperature at which the components are used. To obtain fixed responses despite varying environmental temperatures various complex and expensive solutions have been proposed in the past, such as housing the components in temperature controlled containers or adding temperature sensitive mechanical stressing features to the fiber. Other attempts at solving the problem have been directed to the selection and proportioning of the constituents of the core and cladding materials of fibers, used in making the components, whereby components made from the fibers inherently have good temperature insensitivity and can hopefully be used in many applications without the need for temperature controlled containers, stressing mechanisms or the like.

Prior efforts toward providing an optical fiber with high temperature insensitivity by core and cladding constituent control are revealed by U.S. Pat. Nos. 5,703,978, 5,949,934 and 6,201,918. These patents suggest that changes with respect to temperature of a long-period grating made from a given fiber are directly related to changes in the fiber's effective refractive index $n_{eff}$ with respect to temperature. These patents still farther suggest that a fiber with high temperature insensitivity can be made by formulating the constituents of the core and cladding materials such that the characteristic curve of the core index vs. temperature and the characteristic curve of the cladding index with respect to temperature have substantially the same shape (see FIG. 5 of the '978 patent) so that at every reasonable temperature the rate of change of the core index, $$\frac{dn_{core}}{dT},$$

is equal to the rate of change of the cladding index, $$\frac{dn_{clad}}{dT},$$

to accordingly make the rate of change of the fiber effective index acceptably low or zero at all temperatures.

In regard to the disclosures of the foregoing patents, Inventors have found that it is impractical, and perhaps impossible, to in all cases formulate core and cladding materials such that a grating or other device made with the fiber has the requisite temperature performance. Accordingly, it is an object of the present invention to address one or more of the foregoing disadvantages or deficiencies of the prior art.

SUMMARY OF THE INVENTION

In one aspect, the invention resides in the finding by Inventors that for a fiber having a core co-doped with selected constituents, such as, for example, germanium and boron, the temperature sensitivity characteristic of a long period grating formed in the fiber core, as expressed by a plot of the absolute change in grating wavelength vs. temperature, is a characteristic curve having a temperature $T_m$ at which the sensitivity of the grating wavelength (i.e., the wavelength at which the transmission loss through the grating is a maximum, also referred to as $\lambda_B$) to changes in temperature is a minimum (e.g., the slope of the curve is zero), with the curve increasing smoothly with both increases and decreases in temperature away from the temperature $T_m$.

Another aspect of the invention resides in that Inventors have found that by controlling the constituents of the core and cladding materials of a fiber in certain ways the characteristic temperature $T_m$ can be made to fall at any desired temperature within a useful range of temperatures for the fiber. U.S. Pat. No. 6,201,918 shows, in FIG. 9, a grating having a $T_m$ lying within a range of −5° C. to +5° C., and an article entitled *Temperature Insensitive Long-Period Fiber Grating* by K. Shima, S. Okude, T. Sakai, A. Wada, and R. Yamauchi in Fujikura Technical Review 1998, pages 1 & 2, shows, in FIG. 2, a grating having a $T_m$ lying within a range of +15° C. to +25° C. Neither of these publications, however, suggests the idea of intentionally controlling the constituents of the core and cladding materials to cause the $T_m$ of a fiber, or of a grating or other optical system component made from the fiber, to fall at a wanted temperature, and especially no suggestion is made for intentionally causing the $T_m$ of a fiber to fall at a useful temperature of the fiber not within the range of −5° C. to +5° C. or the range of +15° C. to +25° C.

In keeping with the above, the invention resides in part in an optical fiber for use in making optical communication system components, especially long-period gratings, in said components, and in the method for making such fiber and components, wherein the core material and the cladding material of the fiber are so formulated that their characteristic curves of index vs. temperature are of dissimilar shapes and yet are such that at a selected temperature, which may be approximately the mean or average temperature at which a component made from the fiber is expected to be used, the curves of rate of change of index with respect to temperature of the core $$\left(i.e., \frac{dn_{core}}{dT} \text{ vs. } T\right)$$

and the cladding $$\left(i.e., \frac{dn_{clad}}{dT} \text{ vs. } T\right)$$

materials cross one another (and are therefore equal to one another), or at least have a minimum difference; and as a result of this the rate of change of the effective index of the fiber is acceptably low or zero at the above-mentioned temperature $T_m$, which is equal to the selected temperature, and throughout a substantial range of temperatures extending both below and above the selected temperature.

In another aspect, the invention resides in the method of making an optical fiber with high temperature insensitivity by first making a fiber having regions of core material and cladding material which materials are formulated with the expectation that a fiber drawn from the preform may have characteristic curves of core index vs. temperature and cladding index vs. temperature of such shape that the curves representing the rate of change of these characteristic curves will cross one another or will have a minimum difference at or near the selected temperature, then testing the responsiveness of the fiber, or of a component made from the fiber, to inputs over a range of temperatures including the selected temperature, surmising from this testing how the constituents of the core material and/or of the cladding material are to be changed to have their rate of change curves cross one another or have a minimum difference at a point closer to the selected temperature, making a new fiber in accordance with the surmise and then repeating these steps, if necessary, until acceptable formulations for the cladding and core materials are found.

Still further, another aspect of the invention resides in Inventors having discovered that, for reasonable ranges of temperatures, say from −20° C. to 90° C., after having made a preliminary fiber with a certain composition of cladding constituents, such as silicon dioxide($SiO_2$), phosphorus pentoxide ($P_2O_5$), and fluorine (F) and a certain composition of core constituents, such as silicon dioxide, germanium dioxide ($GeO_2$) and boron trioxide ($B_2O_3$), and after having measured the $T_m$ of that preliminary fiber, if a new fiber is made having substantially the same compositions of constituents for its cladding and its core as the preliminary fiber, except for the concentration of $B_2O_3$ in the core, the new fiber can be made to have a $T_m$ higher than that of the preliminary fiber by making the new fiber with a greater concentration of $B_2O_3$ in its core than the preliminary fiber, or can be made to have a $T_m$ lower than that of the preliminary fiber by making the new fiber with a lesser concentration of $B_2O_3$ in its core than the preliminary fiber.

Another aspect of the invention is that Inventors have found that in measuring the $T_m$ of a preliminary fiber, or of any subsequent fiber, such measurements can be made indirectly and relatively easily, in comparison to previous measurement methods, by measuring the attenuation of a signal of a selected wavelength resulting from the signal being transmitted over a length of the fiber. This in turn also means that in arriving at the core and cladding compositions for a fiber having its $T_m$ at or close to a selected temperature the $T_m$ of that fiber and of preliminary fibers can be determined by measuring the attenuating effect of the fibers without having to go through the step of making and testing a system component from each fiber.

BRIEF DESCRIPTION OF THE DRAWINGS

FIG. 9 is a graph mapping the relationship of measured $T_m$ to measured attenuation of 1550 nm light in dB/km for a large number of exemplary fibers made by Inventors.

DETAILED DESCRIPTION OF THE PREFERRED EMBODIMENT

The optical fiber of this invention has utility in the making of various components of optical communication systems, and is especially of value in the making of long-period gratings. In the following description of the invention, the fiber of the invention is therefore taken to be one used in the making of a long-period grating, but in doing so there is no intention to limit the fiber of the invention to that specific application. The invention does, however, extend to long-period gratings and to methods for making fibers and long-period gratings.

Figure 1A:
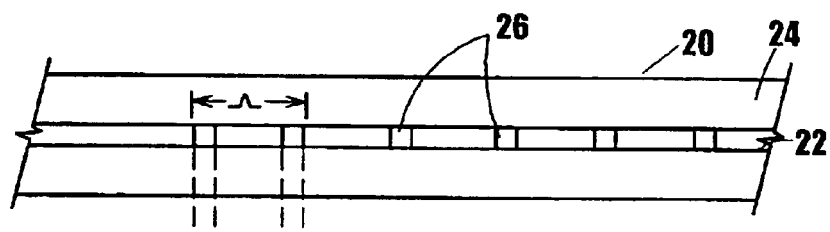
FIG. 1A is a view showing schematically a portion of a long-period grating made using an optical fiber embodying the invention.
Figure 1B:
FIG. 1B is a view showing how the effective refractive index of the fiber of FIG. 1A varies along its length in the region of the grating.

Turning to FIG. 1A, a portion of a fiber 20 embodying the invention is shown and includes a core 22 and a cladding 24. The core 22 is one which is doped with germanium or other suitable material to give it a photosensitive property allowing its refractive index to be changed locally by the application of ultraviolet light. In the fiber 20, the index of the core 22 has been changed at spaced locations along the length of the fiber to create index perturbations 26 in the core 22, which perturbations make up a series of spaced stepwise changes in the effective index of the fiber, as shown in FIG. 1B, to cause the fiber to function as a long-period grating which attenuates, by radiation of light energy from the core to the cladding, light traveling through the core and having a wavelength falling within an attenuation band of wavelengths. A long-period grating made up of index perturbations 26 as shown in FIG. 1A generally includes a large number of such perturbations and only a few of them are shown in FIG. 1A for illustration purposes.

Figure 2:
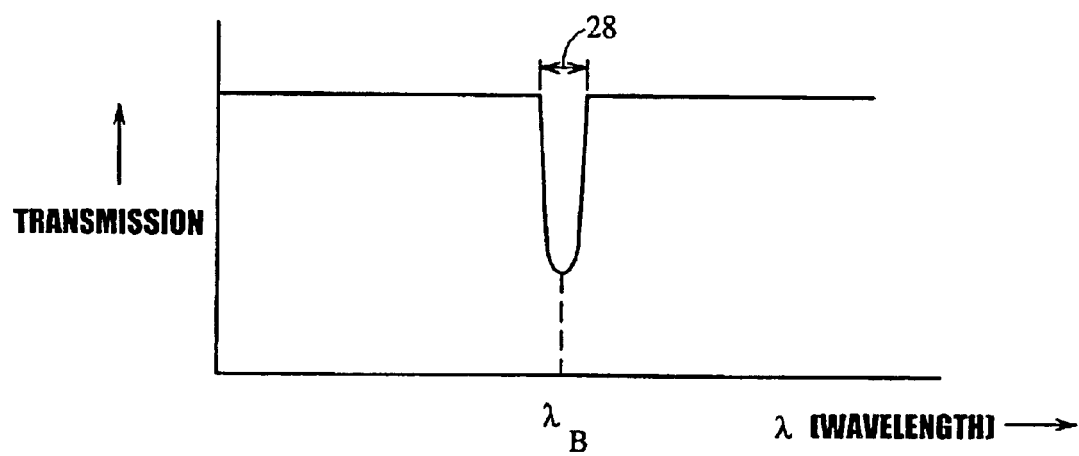
FIG. 2 is a diagram showing the transmission vs. wavelength characteristic curve of the FIG. 1A grating.

A characteristic curve of transmission vs. wavelength for a grating such as shown in FIG. 1A is shown in FIG. 2 with the curve having an attenuation band 28 with a peak transmission loss (peak attenuation) at a wavelength $\lambda_B$. The characteristic curve of FIG. 2 is that obtained when the involved fiber 20 is at a given fixed temperature. In the case of known conventional fibers, the wavelength $\lambda_B$ of a grating made from said fiber will typically vary significantly with changes in temperature. Consequently, if a grating is designed to have an attenuation band with a peak loss wavelength $\lambda_B$ of a specific value at a design temperature, if the operating temperature vanes significantly from the design temperature the grating may no longer satisfactorily spectrally condition light passing through and beyond the grating.

In regard to the transmission vs. wavelength curve of FIG. 2, it is known from previous work in the field that the peak transmission loss wavelength $\lambda_B$ is very closely defined by the following equation:

$$\lambda_B = \Lambda[n_{core} - n_{clad}],  \quad \text{(Equation 1)}$$

where $\Lambda$ is the periodicity of the grating perturbations 26, $n_{core}$ is the refractive index of the fiber's core material, and $n_{clad}$ is the refractive index of the fiber's cladding material.

The rate of change of the wavelength $\lambda_B$ with respect to temperature can therefore be closely obtained by differentiating Equation 1 with respect to temperature and dropping insignificant terms to arrive at the relationship:

$$\frac{d\lambda_B}{dT} = \Lambda \left[ \frac{dn_{core}}{dT} - \frac{dn_{clad}}{dT} \right]. \quad \text{(Equation 2)}$$

From Equation 2, it can be seen that the rate of change of $\lambda_B$ with respect to temperature $$\left( \frac{d\lambda_B}{dT} \right)$$

can be made zero if $$\left( \frac{dn_{core}}{dT} \right)$$

is made to equal $$\left( \frac{dn_{clad}}{dT} \right).$$

Figure 3:
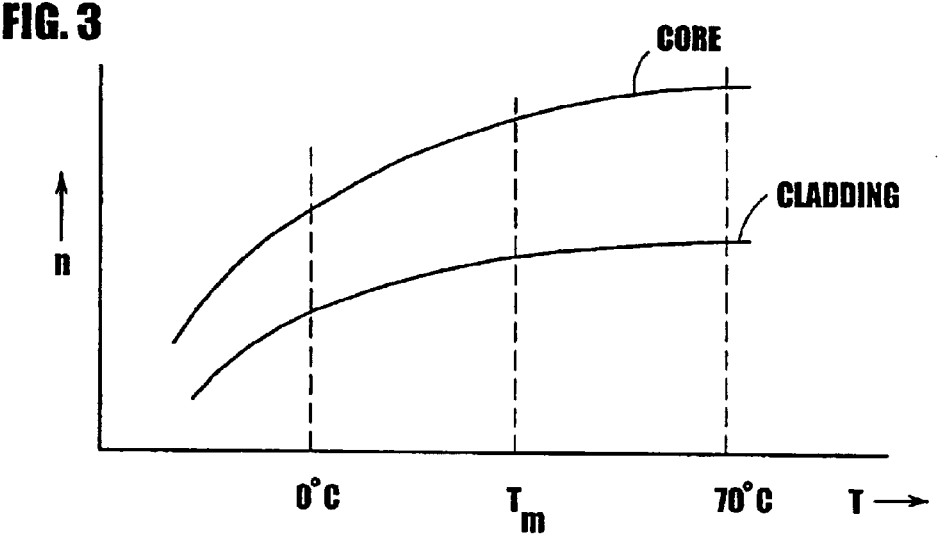
FIG. 3 is a diagram showing characteristic curves of index of refraction vs. temperature for the core and cladding materials of a typical fiber previously used for making optical communication system components, such as long-period gratings.

FIG. 3 shows characteristic curves of refractive index vs. temperature for the core and cladding materials of a typical prior-art fiber used in the making of long period gratings and the like. For the fiber represented by FIG. 3 it can be seen, from inspection of the characteristic curves of FIG. 4, that at no one temperature within the range of 0° C. to 70° C. is the slope (dn/dT) of one curve the same as the slope dn/dT of the other curve, and therefore, in applying Equation 2, at no temperature between 0° C. and 70° C. is $$\frac{d\lambda_B}{dT}$$

equal to zero.

Figure 5:
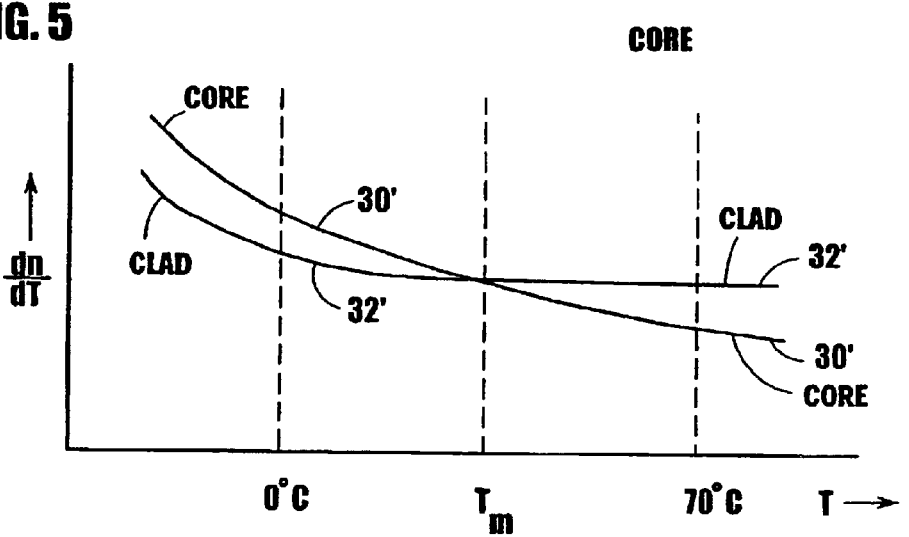
FIG. 5 is a view similar to FIG. 4, but showing dn/dT vs. temperature curves for the core and cladding materials of one fiber embodying the present invention.

U.S. Pat. No. 5,703,978, No. 5,949,934, and No. 6,201,918 propose that the rate of change of $\lambda_B$ with respect to temperature $$\left( \frac{d\lambda_B}{dT} \right)$$

throughout a significant range of temperature be made equal or close to zero by controlling the make-up of the core and cladding materials so that their characteristic curves of index vs. temperature are, as shown for example in FIG. 5 of the '978 patent, of substantially identical shape. The above-mentioned article *Temperature Insensitive Long-Period Fiber Grating* is also concerned only with achieving a flattening of the $\lambda_B$ vs. T characteristic curve of a fiber over a large temperature range.

Inventors have found, however, that it is difficult, and perhaps impossible, to achieve an identical shaping of the characteristic curves of core and cladding indexes vs. temperature, and have further found that by careful formulation of the constituents making up the core and cladding materials, the first derivative curves of core and cladding indexes vs. temperature will cross one another, or will have a minimum difference, at a critical temperature, and that this critical temperature can be made to occur at different selected temperatures.

Figure 4:
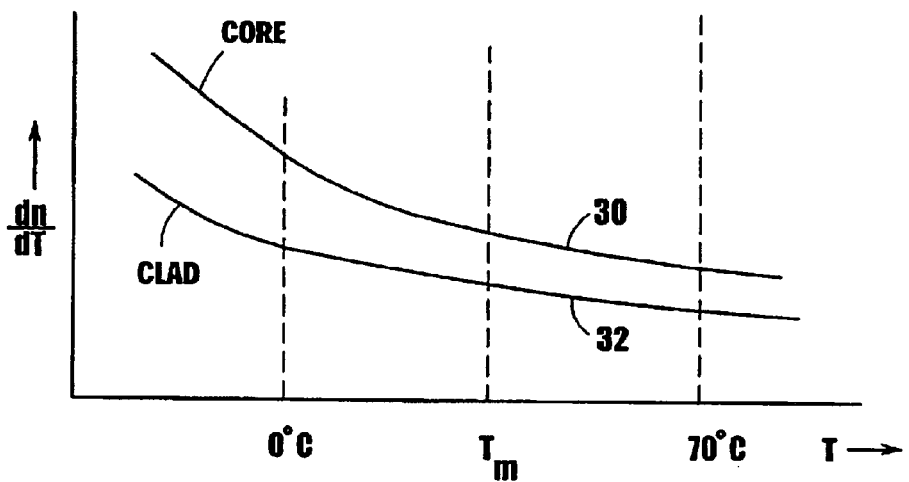
FIG. 4 is a diagram showing curves of dn/dT vs. temperature for the core and cladding materials represented by FIG. 3.

Curves of dn/dT vs. temperature over a reasonable range of temperatures for the core and cladding materials for one type of conventional fiber are approximately as shown by FIG. 4. That is, the curve 32 of the clad material is located below the curve 30 of the core material and the two curves 30 and 32 do not cross one another within a reasonable range of temperatures, such as the illustrated temperature range of 0° C. to 70° C., at which a component made from the fiber would be expected to be used.

This means that at no given temperature within the temperature range of FIG. 4 is $$\frac{dn_{core}}{dT},$$

equal to $$\frac{dn_{clad}}{dT}$$

and, therefore, from Equation 2, at no illustrated temperature is the rate of change of $\lambda_B$ with respect to temperature, $d\lambda_B/dT$, equal or close to zero. From FIG. 4, it can be seen that the two curves 30 and 32 could be made to cross at a temperature within a practical temperature range if in FIG. 4 the curve 32 could be moved upwardly, the line 30 could be moved downwardly, or if at the same time the line 32 could be moved upwardly and the line 30 downwardly.

Figure 6:
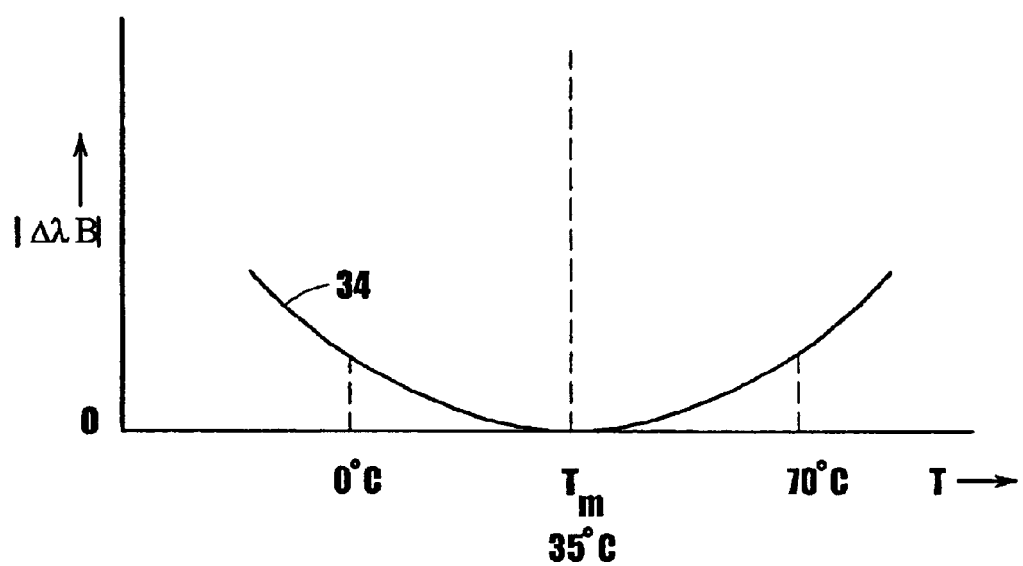
FIG. 6 is a diagram showing the absolute difference between the peak transmission loss wavelength $\lambda_B$ at various temperatures and the grating, or peak transmission loss, wavelength at the critical temperature $T_m$ for a long period grating made from a fiber embodying the invention.

FIG. 5 is similar to FIG. 4, but relates to a fiber embodying the invention so that the two curves 30' and 32' for the core and cladding materials, respectively, cross one another at a selected temperature $T_m$. If the rate of change of index with temperature for the core material and the rate of change of index with temperature for the cladding material is as shown by the lines 30' and 32' of FIG. 5, the absolute change of $\Delta\lambda_B$ as various temperatures from the value of $\Delta\lambda_B$ at temperature $T_m$ will be approximately as shown in FIG. 6 by the curve 34. From FIG. 6 it is seen that to best suit the curve 34 to a practical given temperature range, such as the illustrated range of 0° C. to 70° C., it is desirable that the fiber be one whereby the temperature $T_m$ is located approximately midway between the end points of the practical given temperate range, which for the illustrated range of 0° C. to 70° C. means that $T_m$ should fall at about the temperature of 35° C. In some cases it may be acceptable if $T_m$ falls anywhere within the practical temperature range of 0° C. to 70° C. However, it is more desirable to have $T_m$ fall within a narrower range, such as 30° C. and 40° C., and it is often still more desirable to have the low $T_m$ fall at or very close to one specific temperature, such as 35° C. An important advantage of the invention is the ability to make a fiber having a $T_m$ at a given preselected temperature or at least within a given preselected temperature range.

Inventors have discovered that by controlling the formulation of the core and the cladding materials of a fiber, even though these materials may have differently shaped curves of index vs. temperature, the two derivative curves $$\frac{dn_{core}}{dT} \text{ and } \frac{dn_{clad}}{dT}$$

can be made to cross one another, or to have a minimum difference, at a temperature $T_m$, where the rate of change of $\lambda_B$ with temperature is very low or essentially zero, falling within a range of temperatures at which it is expected that a component made from the fiber will be used, and further that the temperature $T_m$ can be made to be one which is preselected, with such preselected temperature being one, if wanted, falling approximately midway between the low and high temperatures of the expected temperature range of component use.

Methods for making a fiber and a long-period grating having the desired qualities described above are a part of the invention and are now described.

As the first step in the method, an initial determination is made of the rate of index change with changes in temperature (dn/dT) for constituents to be used in the core and cladding materials. For example, in the case of a fiber where the clad is to be made of silicon oxide ($SiO_2$), phosphorus pentoxide ($P_2O_5$) and fluorine (F), and the core is to be made of silicon oxide ($SiO_2$), germanium dioxide ($GeO_2$), and boron trioxide ($B_2O_3$), the involved rates of index change with the changes in temperature are taken from W. Vogel, *Optical Properties of Oxide Glasses*, Edited by D. R. Uhlman and N. J. Kriedl, 1991, page 19, and are as set out below in Table A. Note that F is listed as having a rate of index change of zero with respect to temperature in Table A, as data for F was not included in the foregoing Vogel reference. However, one of ordinary skill in the art, in light of the disclosure herein, will readily appreciate that any index change data for F can be taken into account as taught herein.

TABLE A

| Constituent | dn/dT |
|---|---|
| $SiO_2$ | 102 |
| $P_2O_5$ | −922 |
| F | 0 |
| $GeO_2$ | 194 |
| $B_2O_3$ | −300 |

Then approximate flat curves representing fixed values of dn/dT for both the core material and the cladding material can be gotten through the use of the following modeling equations:

$$\frac{dn_{core}}{dT} = X_{C1} \cdot \frac{dn_{C1}}{dT} + X_{C2} \cdot \frac{dn_{C2}}{dT} + X_{C3} \cdot \frac{dn_{C3}}{dT} + \cdots + X_{Cn} \frac{dn_{Cn}}{dT} \quad \text{(Equation 3)}$$

$$\frac{dn_{clad}}{dT} = X_{D1} \cdot \frac{dn_{D1}}{dT} + X_{D2} \cdot \frac{dn_{D2}}{dT} + X_{D3} \cdot \frac{dn_{D3}}{dT} + \cdots + X_{D4} \frac{dn_{Dn}}{dT} \quad \text{(Equation 4)}$$

where $C_1$, $C_2$, $C_3$, ... $C_n$ are the constituents of the core material; $D_1$, $D_2$, $D_3$ ... $D_n$ are the constituents of the cladding material; and X equals the mole percent of the involved constituent in the involved core or cladding material.

Core and cladding materials are then formulated using Equations 3 and 4 to produce core and cladding materials having, from application of Equations 3 and 4, identical values of dn/dT. In making the formulations, for the core material the concentration of $SiO_2$ and $GeO_2$ are usually largely determined by other factors, and in the making of a cladding material the concentration of $SiO_2$ and of $P_2O_5$ are also largely determined by other factors, so that the most practical way of achieving core and cladding materials having identical dn/dT values, by use of Equations 3 and 4, is to vary the concentration of $B_2O_3$ in the core material. However, in some cases it may be preferable to achieve equality of $$\frac{dn_{core}}{dT} \text{ and } \frac{dn_{clad}}{dT},$$

in accordance with Equations 3 and 4, by varying the concentration of $P_2O_5$ in the cladding material, or by varying both the concentration of $B_2O_3$ in the core material and the concentration of $P_2O_5$ in the cladding material.

After initial formulations for the core material and the cladding material are determined as described above using Equations 3 and 4 an actual fiber is made, by making a preform having regions of core material and cladding material, having such initial formulations, and drawing a fiber from the preform. Then a long-period grating is made from the fiber and the grating is tested to determine the effect of temperature changes on its response characteristics. From this testing it will be found that the grating has a curve of $|\Delta\lambda_B|$ vs. temperature, similar to the curve 34 of the FIG. 6, wherein the temperature $T_m$ has some distinct value. If the testing of the grating shows that its temperature $T_m$ is not equal or close to a preselected desired temperature, such as 35° C., a new fiber is then made by changing preferably only the concentration of $B_2O_3$ in the core material, or alternatively or additionally changing the concentration of $P_2O_5$ in the cladding material, in directions which can be expected to cause a grating using the new fiber to have a $T_m$ closer to the desired value; and this process can be repeated, if necessary, several times to arrive at a fiber having a $T_m$ at, or acceptably close to, the desired value. For example, increasing the concentration of material having a negative change of index of refraction with respect to temperature would lower the curve in FIG. 5 for that portion of the fiber (i.e, either the core or clad) having the increased concentration, and change the intersection point (and hence the $T_m$) of the clad and core curves, 30' and 32', respectively.

Figure 7:
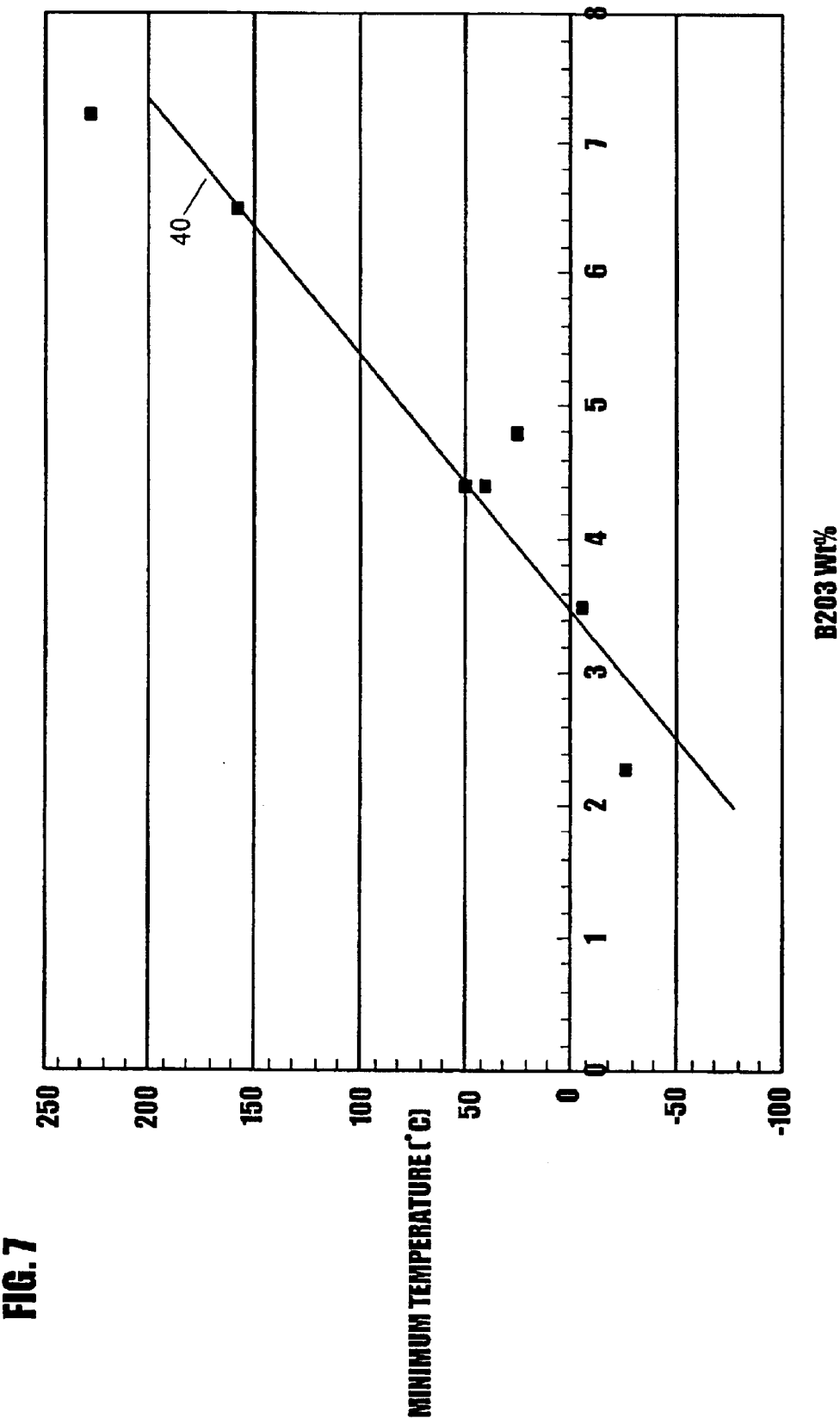
FIG. 7 is a graph mapping the relationship of measured $T_m$ to measured core $B_2O_3$ weight percentage concentration content for several exemplary fibers made by Inventors.

In connection with the making of a new fiber to have a $T_m$ which is closer to the desired or selected value for such characteristic, another aspect of Inventors' invention is the finding by Inventors that for a fiber having a cladding consisting essentially of $SiO_2$, $P_2O_5$, and F, and a core consisting essentially of $SiO_2$, $GeO_2$, and $B_2O_3$, if for a given length of fiber the weight amount of all of the mentioned constituents remain the same except for the weight amount of $B_2O_3$ in the core material, the value of $T_m$ for the fiber is almost directly related to the weight amount of $B_2O_3$ in the core material. In proof of this, Inventors fabricated several fibers which were closely identical to one another in regard to the weight amounts per unit length of $SiO_2$, $P_2O_5$, and F in the cladding and in regard to the amount of $SiO_2$ and $GeO_2$ in the core with the several fibers differing from one another only in regard to the amount of $B_2O_3$ per unit length in the core. (One of ordinary skill appreciates that although the weight amount of a first constituent may remain the same, in that none is added or subtracted from the prior amount, changing the amount of another constituent (e.g., $B_2O_3$) can cause a change in the weight percentages of both constituents.) These fibers were carefully tested to determine the $T_m$ characteristic of each fiber, and FIG. 7 is a graph showing the measured $T_m$ for each of the several fibers in relation to the weight percentage of $B_2O_3$ in the fiber. Referring to FIG. 7, the line 40 represents a close linear fit of the test data taken from the several fibers and provides a good estimation of what weight percentages of $B_2O_3$ to use in the core of a fiber to achieve any desired $T_m$ for the fiber. For example, FIG. 7 shows that if it is desired to produce a fiber having a $T_m$ of 35° C. the core of the fiber should have a $B_2O_3$ weight percentage content of 4.2% with the fiber otherwise having essentially the same weight amounts of the other constituents of the cladding and core, per unit length of the fiber, as in the several fibers represented by FIG. 7.

In particular, each of the fibers of FIG. 7 had a cladding composition and a core composition made up, except for the weight percentage of $B_2O_3$ in the core, of the following constituents in the following ranges of weight percentage per unit length:

| Cladding | Core |
|---|---|
| $SiO_2$ - 98.3 to 97.6 wt. % | $SiO_2$ - 76.2 to 84.3 wt. % |
| $P_2O_5$ - 1.4 to 1.8 wt. % | $GeO_2$ - 13.5 to 16.5 wt. % |
| F - 0.3 to 0.6 wt. % | |

Weight percentages of $B_2O_3$ included in each of the cores of the several fibers are shown in the FIG. 7, where the squares represent data points corresponding to a different one of the several fibers. The weight percentage of $B_2O_3$ varies from 2.2 wt. % to 7.3 wt. %.

FIG. 7 also shows that if a fiber of the involved composition is to have a $T_m$ following between 0° C. to 70° C. the weight percentage of $B_2O_3$ in the core material should fall from 3.4 to 4.8. If it is desired that the $T_m$ fall between 30° C. and 40° C. the weight percentage of $B_2O_3$ in the core should fall from 4.0 to 4.2. If $T_m$ is to fall at approximately 35° C. the weight percentage of $B_2O_3$ in the core should be approximately 4.1.

In the above description of the invention and in the following claims the characteristic temperature $T_m$ is properly a feature of a long-period grating or other optical system device. However, for convenience, a fiber to be used in the making of such device is also sometimes referred to as having such feature. In the latter case, when a fiber is said to have a temperature $T_m$, what is meant is that if the fiber is used to make a device the device will have that characteristic temperature $T_m$.

Figure 8:
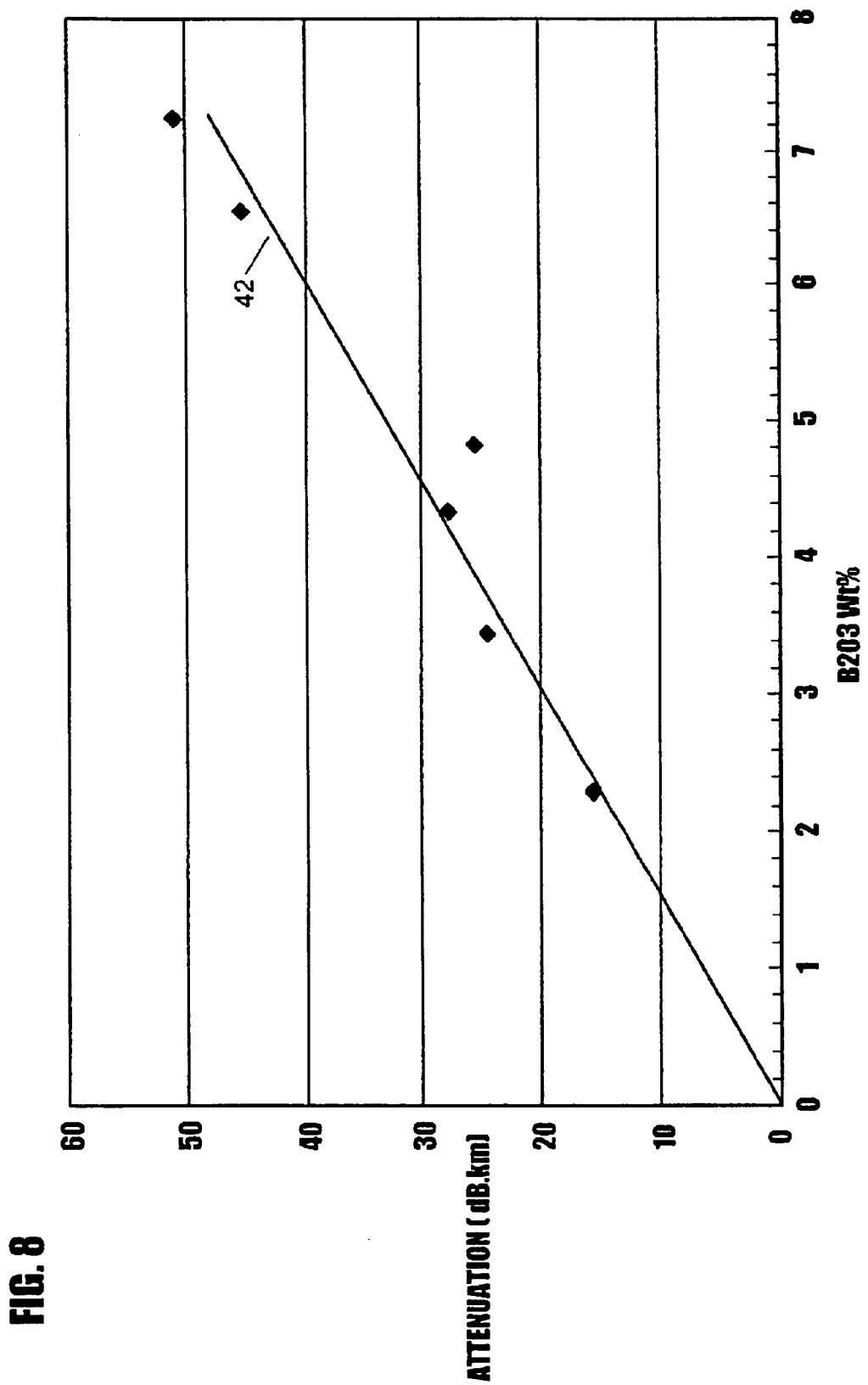
FIG. 8 is a graph mapping the relationship of measured attenuation of 1550 nm light in dB/km to measured core $B_2O_3$ weight percentage concentration for the same fibers as in FIG. 7.

In regard to the several fibers of FIG. 7, the weight percentage of $B_2O_3$ in each of the fibers was accurately determined by testing each fiber by known wavelength dispersion spectroscopy methods, and each fiber was also tested to determine how much a test signal, such as a signal having a wavelength of 1550 nm, was attenuated, typically in terms of dB/km, as a result of that signal being transmitted through a length of the fiber. FIG. 8 shows that the attenuation can be related to the concentration of $B_2O_3$, and in this instance a plot of the results of the attenuation testing of the fibers yields the curve 42 representing a close linear fit to the data points. Because the attenuation can be related to the concentration of $B_2O_3$, and the concentration of $B_2O_3$ is related to the $T_m$, the $T_m$ can be related to the attenuation. Therefore, it will be understood that the attenuation has been found to be essentially directly related to the amount of boron in fibers, and that instead of determining the weight percentage of $B_2O_3$ in a fiber by wavelength dispersion spectroscopy, which is a relatively tedious and difficult procedure, an indirect and yet reasonably accurate and reliable evaluation of the amount of boron in a fiber can be obtained by the more simple process of measuring the amount by which it attenuates, for example in dB/km, a given signal of selected wavelength transmitted through the fiber.

In consequence of the above, it will be further understood that since the $T_m$ characteristic of fibers are considered by Inventors to be essentially directly related to the amount of $B_2O_3$ in a fiber core, as shown by FIG. 7, and since the attenuation of such fiber is also essentially directly related to the weight percentage of $B_2O_3$ in a fiber, as shown in FIG. 8, the attenuation of such fiber can be measured and used as an indication of its characteristic $T_m$. As proof of this, Inventors made and tested a large number of fibers, with all those fibers having essentially the same cladding and core compositions except for the amount of $B_2O_3$ in the core, and tested each of those fibers to determine its attenuation and $T_m$ characteristic; and the results of these tests are shown by the data points plotted in FIG. 9. The line 44 of FIG. 9 represents a close fit to the data points and indicates that the temperature characteristic of a given fiber is essentially directly related to the amount by which it attenuates a signal, typically specified in terms of dB/km, transmitted over a length of the fiber.

From FIG. 9 it can be taken that if it is desired to make a fiber having a $T_m$ characteristic of 35° C. the fiber should be one having a 1550 nm signal attenuation of approximately 26.6 dB/km. Further, it will be understood that should it be desired to produce a fiber with a $T_m$ of 35° C. if a preliminary fiber is found to have an attenuation of less than 26.6 dB/km one will know that a subsequent fiber should be made with a greater amount of $B_2O_3$ in the core than in the preliminary fiber; and if the preliminary fiber is found to have an attenuation greater than 26.6 dB/km one will know that a subsequent fiber should be made with a lesser amount of $B_2O_3$ in the core than in the core of the preliminary fiber.

Also from FIG. 9, it is seen that, for fibers of the involved composition, if it is sufficient that the $T_m$ of a fiber fall within the range of 0C. to 70° C. the attenuation by the fiber of a 1550 nm signal should fall within the range of 21.9 dB/km to 31.3 dB/km. For a fiber having a $T_m$ within a range of 40° C. to 50° C., the attenuation of a 1550 m signal should be 27.2 dB/km to 28.6 dB/km. If it is desired that the $T_m$ of a fiber fall within the range of 30° C. to 40° C. the attenuation by the fiber of a 1550 nm signal should fall within a range of 25.9 dB/km to 27.2 dB/km.

As understood by one of ordinary skill in the art, gratings, such as long-period gratings, are often formed by selectively exposing a photosensitive optical fiber to actinic radiation, thereby creating spaced regions of the fiber wherein the index of refraction of the core is changed. However, gratings can be made by a variety of other techniques, such as, for example, using a microburner to thin spaced sections of an optical fiber or by acoustically exciting the fiber to create a standing or traveling wave.

A fiber according to the invention can comprise the constituents noted as above, preferably in the concentrations noted above. More preferably, a fiber according to the invention consists of the constituents noted above and in the concentrations noted above. However, as is known in the art, in many instances certain small amounts of undesired trace materials may be included in the makeup of the core and the cladding materials, but at levels that do not affect the fundamental properties of the fiber presented herein. These unavoidable small amounts have been omitted from the discussion and may be considered to be part of the $SiO_2$, such that a fiber according to the invention consists essentially of the materials and concentrations mentioned above. A proviso is made to the foregoing, in that one of ordinary skill in the art understands that a fiber having a region that is said to consist or consist essentially of enumerated constituents that include $GeO_2$ and $SiO_2$ also includes some GeO, and that such GeO may be responsible for the photosensitive phenomenon.

Several embodiments of the invention have been described and illustrated herein. Those of ordinary skill in the art, in light of the disclosure herein, will readily envision a variety of other approaches for performing the functions and/or obtaining the results or advantages described herein. More generally, those skilled in the art would readily appreciate that all parameters, dimensions, materials and configurations described herein are meant to be exemplary and that actual parameters, dimensions, materials and configurations will depend on specific applications for which the teaching of the present invention are used. Each of such variations or modifications is deemed to be within the scope of the present invention. Those skilled in the art will recognize or be able to ascertain using no more than routine experimentation many equivalents to the specific embodiments of the invention described herein. For example, the wavelength at which the attenuation is measured is typically very near or the same as the grating wavelength. However, one of ordinary skill in the art understands that the wavelength at which attenuation is measured need not be the same or near the grating wavelength, and that relating the attenuation to the grating wavelength can include relating the slope of the attenuation with wavelength to the concentration selected material and/or the grating wavelength.

It is therefore to be understood that the foregoing embodiments are presented by way of example only and that within the scope of the appended claims and equivalents thereto, the invention may be practiced otherwise than as specifically described. For example, as noted above silica is the preferable host glass of the fiber cladding and/or core, to which other materials are added, such as germanium in form of $GeO_2$, boron in the form of $B_2O_3$, and the others noted above, such as fluorine. As understood by one of ordinary skill, constituents may be present in different forms, especially in different host glasses. Use of the more general term, such as boron, means that the fiber in question includes boron, which may be present, for example, as $B_2O_3$ or as a different oxide. However, many other materials can be added to silica to affect the index of refraction, the rate of change of index of refraction with temperature, or the photosensitivity of the fiber. Known dopant materials used with silica include, but are not limited to, aluminum, phosphorus, titanium, tantalum, the rare earths (such as, for example, erbium, ytterbium and lanthanum) and the transition metals, which can be used to provide selected attenuation. In addition, other types of glass, such as, for example, chalcogenide glass, ZBLAN glass, phosphate glass, fluoride glass, germanium based glass and the like, as well as any of the single crystal or polycrystalline materials such as thallium bromoiodide, germanium, zinc selenide, antimony silicate and the like, may be found suitable for the host glass of the core or cladding of a fiber according to the invention. Photosensitive materials useful with at least silica, even in the absence of germanium, include Ce, Eu, aluminum, phosphorus and tantalum. Fluorozirconate fiber and silicon oxynitride fiber are also known to be photosensitive. By way of example, and not of limitation, an optical fiber according to the invention may comprise these or other materials, or variants thereof, singly or in combination in the core, cladding or other layers.

As described above, the relationship between attenuation and the $T_m$ of a device is established via the relationship between the concentration of boron and the attenuation and the relationship between the concentration of boron and the $T_m$. However, practice of the invention is not considered as limited to the use of boron. As described above, other materials can be used to vary the $T_m$. In other practices of the invention, such as where the concentration of a different material is used to vary the $T_m$ of a device, a suitable relationship can be established, as taught herein, such that the relationship between attenuation and the $T_m$ can be quantified and used to determine whether a particular device made with the fiber will have an acceptable $T_m$.

It will be understood that in the claims as well as in the specification above all transitional phrases such as "composing", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, $7^{th}$ Edition, Revision 1.

We claim:

1. The method of testing an optical fiber for use in making components of optical communication systems, said method comprising:
    selecting a temperature range within which a component made of a fiber is to have a minimum temperature sensitivity,
    relating said temperature range to a target range of attenuation of light transmitted through the fiber,
    providing the fiber,
    testing said provided fiber to determine its attenuation of light; and
    determining an acceptability of the provided fiber by comparing the determined attenuation to said target attenuation range.

2. The method of claim 1, wherein:
    said attenuation is a characteristic of a fiber quantifiable in terms of dB per unit length of the fiber at a selected test wavelength.

3. The method of claim 2, wherein:
    said test wavelength is approximately 1550 nm.

4. The method of making an optical fiber for use in making components of optical communication systems, said method comprising:
    selecting a temperature range within which a component made of a fiber is to have a minimum temperature sensitivity,
    relating said temperature range to a target range of attenuation of an optical test signal transmitted through the fiber,
    making the fiber with a core and cladding with the core including a given concentration of $B_2O_3$,
    testing the fiber to determine its attenuation of said signal,
    if the determined attenuation of said signal by the fiber falls outside of said target range of attenuation, making a new fiber wherein the core has a concentration of $B_2O_3$ different from the concentration of $B_2O_3$ in the preceding fiber, testing the new fiber to determine its attenuation of said signal, and if the determined attenuation of the signal by the new fiber falls outside of the target range of attenuation, repeating said steps of making and testing a new fiber until arriving at a fiber having an attenuation of said signal which falls into said target range.

5. The method of making an optical fiber for use in making components of optical communication system, said method comprising:

selecting a temperature range within which it is desired that a temperature characteristic $T_m$ of the fiber fall, which temperature characteristic $T_m$ is the temperature at which the rate of change of a response of a component made from the fiber to an optical signal of given wavelength with respect to temperature passes through zero, relating said selected temperature range to a target range of attenuation of an optical test signal of given wavelength transmitted through the fiber, making a preform having regions of core material and cladding material, with the core material including a given concentration of $B_2O_3$, drawing a fiber from said preform, testing the fiber to determine its attenuation of said signal per unit length of the fiber, if said determined attenuation of said signal by said fiber falls outside of said target range of attenuation, making a new preform wherein the core material has a concentration of $B_2O_3$ different from that of the core material of the preceding preform, drawing a new fiber from the new preform, testing the new fiber to determine its attenuation of said test signal per unit length of the fiber, and if the determined attenuation of the signal by the new fiber falls outside of said target range of attenuation, repeating said steps of making a new preform, drawing a fiber from the new preform and testing the new fiber until arriving at a fiber having an attenuation of said test signal which falls into said target range of attenuation.

6. The method of claim 5, wherein:

in said step of making a new preform the cladding material of the new preform has the same composition as the cladding material of the preceding preform.

7. The method of claim 5, wherein:

when a fiber drawn from one preform has an attenuation falling below the target range of attenuations, making the core material of the next preform have a greater concentration of $B_2O_3$ than in the core material of the one preform.

8. The method of claim 5, wherein:

when a fiber drawn from one preform has an attenuation falling above the target range of attenuations, making the core material of the next preform have a lesser concentration of $B_2O_3$ than in the core material of the one preform.

9. The method of claim 5, wherein:

said core material comprises $GeO_2$, $B_2O_3$, and $SiO_2$.

10. The method of claim 5, wherein:

said target attenuation range is 21.9 dB/km to 31.3 dB/km.

* * * * *